(12) United States Patent
Rochelle (10) Patent No.: US 7,901,487 B2
(45) Date of Patent: Mar. 8, 2011

(54) REGENERATION OF AN AQUEOUS SOLUTION FROM AN ACID GAS ABSORPTION PROCESS BY MULTISTAGE FLASHING AND STRIPPING

(75) Inventor: Gary T. Rochelle, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1244 days.

(21) Appl. No.: 10/548,853

(22) PCT Filed: Mar. 4, 2004

(86) PCT No.: PCT/US2004/006580
§ 371 (c)(1),
(2), (4) Date: Jun. 19, 2006

(87) PCT Pub. No.: WO2004/080573
PCT Pub. Date: Sep. 23, 2004

(65) Prior Publication Data
US 2007/0028774 A1 Feb. 8, 2007

Related U.S. Application Data

(60) Provisional application No. 60/453,279, filed on Mar. 10, 2003.

(51) Int. Cl.
*B01D 53/14* (2006.01)
(52) U.S. Cl. ............... 95/160; 95/163; 95/172; 95/191; 95/192; 95/207; 95/208; 95/235; 95/236; 96/234
(58) Field of Classification Search ............ 95/235–236, 95/159, 160, 163, 166, 169, 172, 192, 191, 95/207, 208; 422/171, 178; 96/234
See application file for complete search history.

(56) References Cited

U.S. PATENT DOCUMENTS 3,690,861 A 9/1972 Covey et al. ............ 504/182

(Continued)

FOREIGN PATENT DOCUMENTS

GB 1484050 8/1977

(Continued)

OTHER PUBLICATIONS

Malaysian Office Action, issued in International Application No. PI 20040821, dated Dec. 13, 2007.

(Continued)

Primary Examiner — Duane Smith
Assistant Examiner — Ives Wu
(74) Attorney, Agent, or Firm — Fulbright & Jaworski L.L.P.

(57) ABSTRACT

An acid gas such as carbon dioxide, hydrogen sulfide, or a mixture thereof is removed from gaseous streams using aqueous absorption and stripping processes. By replacing the conventional stripper used to regenerate the aqueous solvent and capture the acid gas with a multipressure stripper (51) that combines acid gas compression with stripping, less energy is consumed. The multipressure stripper is a multistage flash (52, 55, 59) in which the total vapor flow from each stage is compressed and fed to the bottom of the previous flash stage at a higher pressure. In this process, the heat in the water content of the vapor exiting each stage is utilized at a higher pressure in the previous stage. The described stripping process generates the acid gas at a higher pressure without operating the stripper at a higher temperature, thereby reducing the energy consumption of the system.

15 Claims, 2 Drawing Sheets

U.S. PATENT DOCUMENTS

| | | | |
|---|---|---|---|
| 4,152,217 A | 5/1979 | Eisenberg et al. | 203/2 |
| 4,160,810 A | 7/1979 | Benson et al. | 423/220 |
| 4,189,307 A * | 2/1980 | Marion | 48/197 R |
| 4,258,019 A | 3/1981 | Hiller et al. | 423/223 |
| 4,384,875 A | 5/1983 | Batteux et al. | 95/246 |
| 4,477,419 A | 10/1984 | Pearce et al. | 423/228 |
| 4,553,984 A | 11/1985 | Volkamer et al. | 95/177 |
| 4,780,115 A | 10/1988 | Ranke | 95/176 |
| 5,145,658 A * | 9/1992 | Chao | 423/232 |
| 5,435,977 A * | 7/1995 | Chao | 422/171 |
| 6,139,605 A | 10/2000 | Carnell et al. | 95/164 |
| 2004/0036055 A1 * | 2/2004 | Asprion et al. | 252/180 |

FOREIGN PATENT DOCUMENTS

| | | |
|---|---|---|
| WO | WO 2004/080573 | 9/2004 |

OTHER PUBLICATIONS

Freguia and Rochelle, "Modeling of CO2 capture by aqueous monoethanolamine," *AIChE J.*, 49:1676-1686, 2003.

Kohl and Riesenfeld, "Gas purification," Chapter 2 and Chapter 5, *Gulf Publishing*, 1985.

Rochelle and Seibert, "Carbon dioxide capture by absorption with potassium carbonate," *Proposal to the Department of Energy*, submitted Jul. 23, 2001, granted on Dec. 9, 2002.

* cited by examiner

REGENERATION OF AN AQUEOUS SOLUTION FROM AN ACID GAS ABSORPTION PROCESS BY MULTISTAGE FLASHING AND STRIPPING

This application is a national phase application under 35 U.S.C. §371 of International Application No. PCT/US2004/006580, filed 4 Mar. 2004, which claims priority to U.S. Provisional Application No. 60/453,279 filed 10 Mar. 2003. The entire text of each of the above-referenced disclosures is specifically incorporated herein by reference without disclaimer. The present invention relates generally to the removal and capture of acid gases such as carbon dioxide, hydrogen sulfide and mixtures thereof from gases containing same through aqueous absorption and stripping processes. More particularly, it provides methods for reducing the energy consumption of such absorption and stripping processes.

A common viewpoint held by a significant segment of the environmental community is that carbon dioxide released into the air plays a major role in global climate change. Thus, global climate change initiatives such as the Kyoto Protocol have identified the curtailment of carbon dioxide releases from fossil fuel combustion and other point sources as a primary means of reducing global climate change. Extensive programs already in place are beginning to demonstrate the economic and technical feasibility of sequestering carbon dioxide by approaches such as injection in underground reservoirs (see, Bergman, P. D. et al, "Disposal of Power Plant CO2 in Depleted Oil and Gas Reservoirs in Texas," presented at the Third International Conference on Carbon Dioxide Removal, Cambridge, Mass., Sep. 9-11, 1996) and disposal in the deep ocean (Fuijioka, Y. et al., "Cost Comparison of Various CO2 Ocean Disposal Options," presented at the Third International Conference on Carbon Dioxide Removal, Cambridge, Mass., Sep. 9-11, 1996).

One method of curtailing carbon dioxide releases in the industrial arena involves removing carbon dioxide from combustion gases and other gases. Carbon dioxide is emitted in large quantities from fuel combustion by mobile and stationary sources. Carbon dioxide capture/sequestration will be most effective if applied to large stationary sources. The largest single sources of carbon dioxide are conventional coal-fired power plants. These sources represent 30 to 40% of the carbon dioxide emissions in the United States. Technology developed for such sources should also be applicable to $CO_2$ capture from gas and oil fired boilers, combined cycle power plants, coal gasification, and hydrogen plants. Absorption/stripping is primarily a tail-end technology and is therefore suitable for both existing and new boilers. Specifically, it can be used with existing coal-fired boilers, especially if they already have scrubbers for $SO_2$-abatement.

The use of absorption and stripping processes with aqueous solvents such as alkanolamines and promoted potassium carbonate is a known, effective technology for the removal and capture of carbon dioxide from flue gas, natural gas, hydrogen, synthesis gas, and other gases. U.S. Pat. Nos. 4,477,419 and 4,152,217, each of which is incorporated herein by reference, describe aspects of this technology. Alkanolamine absorption/stripping is one proven and effective technology for carbon dioxide capture from gas. The first generation of this technology uses aqueous solutions of monoethanolamine (MEA). Advances in this technology have provided other alkanolamine solvents for carbon dioxide treating in various industries. Monoethanolamine (MEA), diethanolamine (DEA), and the hindered amine AMP are used alone in an aqueous solution. Typical solvent blends include a methyldiethanolamine (MDEA) solution promoted by piperazine or other secondary amines. Also, potassium carbonate solvents are commonly promoted by DEA or other reactive amines.

Gas absorption is a process in which soluble components of a gas mixture are dissolved in a liquid. Stripping is essentially the inverse of absorption, as it involves the transfer of volatile components from a liquid mixture into a gas. In a typical carbon dioxide removal process, absorption is used to remove carbon dioxide from a combustion gas, and stripping is subsequently used to regenerate the solvent and capture the carbon dioxide contained in the solvent. Once carbon dioxide is removed from combustion gases and other gases, it can be captured and compressed for use in a number of applications, including sequestration, production of methanol, and tertiary oil recovery.

The conventional method of using absorption/stripping processes to remove carbon dioxide from gaseous streams is described in U.S. Pat. No. 4,384,875, which is incorporated herein by reference. In the absorption stage, the gas to be treated, containing the carbon dioxide to be removed, is placed in contact, in an absorption column, with the chosen absorbent under conditions of pressure and temperature such that the absorbent solution removes virtually all the carbon dioxide. The purified gas emerges at the top of the absorption column and, if necessary, it is then directed towards a scrubber employing sodium hydroxide, in which the last traces of carbon dioxide are removed. At the bottom of the absorption column, the absorbent solution containing carbon dioxide (also called "rich solvent") is drawn off and subjected to a stripping process to free it of the carbon dioxide and regenerate its absorbent properties.

To effect the regeneration of the absorbent solution, the rich solvent drawn off from the bottom of the absorption column is introduced into the upper half of a stripping column, and the rich solvent is maintained at its boiling point under pressure in this column. The heat necessary for maintaining the boiling point is furnished by reboiling the absorbent solution contained in the stripping column. The reboiling process is effectuated by indirect heat exchange between part of the solution to be regenerated located in the lower half of the stripping column and a hot fluid at appropriate temperature, generally saturated water vapor. In the course of regeneration, the carbon dioxide contained in the rich solvent to be regenerated maintained at its boiling point is released and stripped by the vapors of the absorbent solution. Vapor containing the stripped carbon dioxide emerges at the top of the stripping column and is passed through a condenser system which returns to the stripping column the liquid phase resulting from the condensation of the vapors of the absorbent solution which pass out of the stripping column with the gaseous carbon dioxide. At the bottom of the stripping column, the hot regenerated absorbent solution (also called "lean solvent") is drawn off and recycled to the absorption column after having used part of the heat content of the solution to heat, by indirect heat exchange, the rich solvent to be regenerated, before its introduction into the stripping column.

In simple absorption/stripping as it is typically practiced in the field, aqueous rich solvent is regenerated at 100-120° C. in a simple, countercurrent, reboiled stripper operated at a single pressure, which is usually 1-2 atm. The rich solvent feed is preheated by cross-exchange with hot lean solvent product to within 5-30° C. of the stripper bottoms. The overhead vapor is cooled to condense water, which is returned as reflux to the countercurrent stripper. When used for carbon dioxide sequestration and other applications, the product carbon dioxide is compressed to 100-150 atm.

A major problem with the existing absorption/stripping process described above is that it is very energy intensive, and this is largely because the heat required for the heat reboiler is significant. In application on a coal-fired power plant, the required heat of such a process can reduce net power production by as much as 15 to 30%. (Herzog, H., E. Drake, & E. Adams, "CO2 Capture, Reuse, and Storage Technologies for Mitigating Global Climate Change," final rept, DOE Order No. DE-AF22-96PC01257, 1997). Therefore, it is important to maximize energy efficiency in the design and operation of these systems. The primary method for enhancing energy efficiency is the recovery of useful heat from the overhead condenser, as the overhead vapor can contain one to ten moles of water vapor for every mole of carbon dioxide. Common forms of heat recovery currently practiced include vapor recompression and multieffect strippers. In vapor recompression, the overhead vapor is compressed by a factor of two to ten and then exchanged with the bottoms liquid to provide heat for the reboiler. With multieffect strippers, two or more strippers are operated in parallel, but each stripper is operated at a significantly different pressure. The vapor from a higher pressure stripper is used to heat the reboiler of a lower pressure stripper in a cascade arrangement. Unfortunately, both of these configurations result in a loss of energy in the required heat exchanger.

As noted in U.S. Pat. No. 4,152,217, several attempts have been made to reduce the overall cost associated with the regeneration of absorbent liquid streams. By devising a system in which the spent absorbent/lean absorbent heat exchanger, the overhead cooler-condenser, the reflux drum, and the reflux pump, ordinarily constructed and used with a conventional stripper or regenerator, could be eliminated, the patentee in U.S. Pat. No. 3,690,861 sought to reduce capital investment costs. While capital investment was considerably reduced in the disclosed process, no consideration was given to how the elimination of heat exchangers would affect overall heat requirements of the system. As described in U.S. Pat. No. 4,152,217, it has been found that elimination of heat exchangers increases the overall heat requirements of the system. Thus, while initial capital expenditures are considerably lessened, long term operating expenses, especially in view of rising energy costs, would be higher in an absorption/stripping process that eliminates heat exchangers.

Other patents have disclosed various methods for improving the cost effectiveness of carbon dioxide removal systems by reducing the energy requirements of such systems. One such patent, U.S. Pat. No. 4,553,984, which is incorporated herein by reference, discloses a method in which the rich solvent laden with carbon dioxide is regenerated without the use of a stripping column simply by flashing in one or more flash stages. The disclosed method is said to substantially reduce both capital costs and energy costs. However effective at reducing costs such a technology may be, it may be ineffective for applications which require the captured carbon dioxide to be produced at a higher pressure for use in sequestration, production of methanol, tertiary oil recovery, or other applications. At the very least, such a technology may require significant capital expenditure for the addition of a compressor to enable the captured carbon dioxide to be compressed for use in applications that require higher pressure carbon dioxide.

In light of the above, it would be advantageous to provide for technology in which carbon dioxide can be removed from combustion gases and other gases by an absorption/stripping process that is significantly more energy efficient than the processes currently practiced. The ideal system would generate carbon dioxide at a higher pressure without operating the stripper at a greater temperature. Such a system would, in turn, significantly reduce the energy cost associated with systems in which the carbon dioxide must be compressed for sequestration, production of methanol, tertiary oil recovery, or other applications.

Any problems or shortcomings enumerated in the foregoing are not intended to be exhaustive but rather are among many that tend to impair the effectiveness of previously known techniques. Other noteworthy problems may also exist; however, those presented above should be sufficient to demonstrate that apparatus and methods appearing in the art have not been altogether satisfactory and that a need exists for the techniques disclosed herein.

The present invention overcomes deficiencies in the prior art by providing, among other things, a method for using aqueous absorption and stripping processes to remove an acid gas from gaseous streams in a manner that generates said acid gas at a higher pressure while consuming less energy than the existing technology. The method involves replacing the conventional single-pressure stripper used to regenerate the aqueous solvent and capture the carbon dioxide with a multipressure stripper that combines acid gas compression with stripping. By generating the acid gas at a higher pressure without operating the stripper at a greater temperature, the method reduces the energy consumption of systems in which the carbon dioxide must be compressed for sequestration, production of methanol, tertiary oil recovery, or other applications.

In one embodiment, the present invention concerns an improved method for removing an acid gas from a gaseous stream containing same using aqueous absorption and stripping equipment, the improvement comprising:
  (a) passing the acid gas-rich solvent stream exiting the absorbing equipment through a multipressure stripper in which the acid gas-rich solvent stream passes through multiple flash stages such that the vapor obtained by flashing the acid gas-rich solvent stream in each flash stage strips the acid gas from the acid gas-rich solvent stream, resulting in an acid gas-rich gaseous stream exiting the multipressure stripper and an acid gas-lean solvent stream exiting the multipressure stripper; wherein the multipressure stripper is operated at multiple pressure levels such that the vapor obtained in each flash stage is compressed in a compressor and fed to the previous flash stage at a higher pressure; and
  (b) recycling the acid gas-lean solvent stream exiting the multipressure stripper in step (a) back to the absorption equipment at least once,
  wherein additional heat is supplied at the flash stage operated at the lowest pressure level.

In another embodiment of the present invention, each stage of the multipressure stripper from the stripping process is a countercurrent contactor.

In another embodiment of the present invention, one or more of the stages of the multipressure stripper from the stripping process is a cocurrent contactor.

In another embodiment of the present invention, one or more of the stages of the multipressure stripper from the stripping process is a mixed contactor.

In another embodiment of the present invention, additional heat is supplied at one or more of the stages of the stripping column other than the flash stage operated at the lowest pressure level.

In another embodiment of the present invention, the invention involves a stripping equipment for stripping an acid gas from an acid gas-rich solvent stream. This equipment includes a stripping column containing multiple flash stages.

The equipment also includes a compressor connected between each of the flash stages such that vapor produced in each flash stage is compressed and fed to the previous flash stage at a higher pressure. The equipment also includes means for supplying additional heat at the flash stage operated at the lowest pressure level.

In another embodiment of the present invention, the invention involves a stripping equipment for stripping an acid gas from an acid gas-rich solvent stream. This equipment includes a stripping column containing multiple flash stages. The equipment also includes a compressor connected between each of the flash stages such that vapor produced in each flash stage is compressed and fed to the previous flash stage at a higher pressure. The equipment also includes means for supplying additional heat at the flash stage operated at the lowest pressure level.

In another embodiment of the present invention, each stage of the stripping column from the stripping equipment is a countercurrent contactor.

In another embodiment of the present invention, one or more of the stages of the stripping column from the stripping equipment is a cocurrent contactor.

In another embodiment of the present invention, one or more of the stages of the stripping column from the stripping equipment is a mixed contactor.

In another embodiment of the present invention, the equipment further comprises means for supplying additional heat at one or more of the stages of the multipressure stripper other than the flash stage operated at the lowest pressure level.

In the present invention, in an absorption process stage, the gaseous stream is contacted with an aqueous solvent (such as an aqueous amine, an aqueous alkanolamine or mixtures thereof, or an amine promoted aqueous potassium carbonate) in an absorption equipment-such that the acid gas in the gaseous stream is transferred from the gaseous stream to the solvent, resulting in a purified gaseous stream exiting the absorption equipment and an acid gas-rich solvent stream exiting the absorption equipment. In a stripping stage, the acid gas-rich solvent stream exiting the absorption equipment is passed through a multipressure stripper in which the acid-gas-rich solvent stream passes through multiple flash stages such that the vapor obtained by flashing the acid gas-rich solvent stream in each flash stage strips the acid gas from the acid gas-rich solvent stream, resulting in an acid gas-rich gaseous stream exiting the multipressure stripper and an acid gas-lean solvent stream exiting the multipressure stripper. In the stripping stage, the multipressure stripper is operated at multiple pressure levels such that the vapor obtained in each flash stage is compressed in a compressor and fed to the previous flash stage at a higher pressure. In the final step of the method of the present invention, the acid gas-ean solvent stream exiting the multipressure stripper is recycled back to the absorption equipment.

Conveniently, the gaseous stream to be treated by the present method is comprised of flue gas, natural gas, hydrogen gas, or synthesis gas.

As used in the specification, "a" or "an" may mean one or more. As used in the claim(s), when used in conjunction with the word "comprising", the words "a" or "an" mean one or more than one unless explicitly stated otherwise. As used herein "another" may mean at least a second or more.

Other objects, features, and advantages of the present invention will become apparent from the following detailed description. It should be understood, however, that the detailed description and the specific examples, while indicating illustrative embodiments of the invention, are given by way of illustration only, since various changes and modifications within the spirit and scope of the invention will become apparent to those skilled in the art from this detailed description.

The following drawings form part of the present specification and are included to further demonstrate certain aspects of the present invention. The invention may be better understood by reference to one or more of these drawings in combination with the detailed description of specific embodiments presented herein.

According to the present invention it is possible to minimize the heat energy requirements associated with the removal and capture of carbon dioxide from a gaseous stream by aqueous absorbent and stripping processes. This is attained by combining aqueous absorption with multipressure stripping. Because the present invention results in the captured acid gas being in a compressed state, the invention may be most beneficial in systems requiring compressed acid gas for applications such as sequestration, production of methanol, and tertiary oil recovery.

The present invention utilizes aspects of the process of aqueous absorption, as described in U.S. Pat. No. 6,139,605, which is incorporated herein by reference. Through this process, an acid gas such as carbon dioxide, hydrogen sulfide, or a mixture thereof is removed from gaseous streams by contacting the gaseous stream with a liquid absorbent that absorbs the acid gas. As industrial applications expected to benefit from the present invention require the concentration of the acid gas to be reduced to a very low level, the absorbent is generally selected to be one that reacts with the acid gas. Examples of absorbent liquids suitable for use in the present invention for the absorption of the acid gas include, but are not limited to, amine promoted aqueous potassium carbonate and aqueous solutions of amines and alkanolamines, Non-limiting examples of alkanolamines suitable for use in the present invention are monoethanolamine (MEA), diethanolamine (DEA), and methyl diethanolamine (MDEA).

The absorption step may be carried out by contacting the gaseous stream at a relatively low temperature but at an elevated pressure in an absorption column with a stream of the absorbent liquid, referred to at this stage as "lean solvent," flowing counter-current to the gaseous stream. As described in U.S. Pat. No. 4,384,875, the purified gaseous stream emerges from the top of the absorber, while the absorbent liquid containing the acid gas, referred to at this stage as "acid gas-rich solvent," emerges from the bottom of the absorber. To capture the acid gas and regenerate the absorbent liquid so it can be recirculated back to the top of the absorber column as lean solvent, the rich solvent is treated with a stripping process.

In conventional absorption/stripping, the aqueous solvent is regenerated in a simple, countercurrent, reboiled stripper operated at a single pressure. To carry out the stripping process in the present invention, a multipressure stripper is employed. The multipressure stripper integrates the acid gas compression with stripping. The stripper itself is a multistage flash in which the total vapor flow from each stage is compressed and fed to the previous flash stage at a higher pressure. In this process, the heat in the water content of the vapor exiting each stage is utilized at a higher pressure in the previous stage. This is significant because the overhead vapor can contain one to ten moles of water vapor for every mole of the acid gas. The described stripping process generates the acid gas at a higher pressure without operating the stripper at a higher temperature, thereby reducing the energy consumption of the system.

The multipressure stripping process of the present invention may be undesirable in certain distillation and stripping applications because compressors are currently expensive to the point of being cost prohibitive. However, in applications where a compressor is already required to achieve a desired end result, the multipressure stripping process can be implemented with little additional cost.

The present invention finds application in a vast array of fields. Because it integrates compression with stripping to produce a compressed acid gas product, the invention may be particularly attractive in systems that require compression of the product acid gas for applications such as sequestration, production of methanol, and tertiary oil recovery. Such systems will already have a compressor incorporated into their current configuration, and thus it will not be necessary to expend the significant capital necessary to purchase a compressor for use in the present invention.

In addition, as environmental concerns magnify, industry may be forced to further explore and adopt various technologies that effectively reduce acid gas (such as, for example, carbon dioxide) emissions in an energy-efficient manner. In such a scenario, the present invention will be highly desirable to an even greater spectrum of industry due to its energy-efficient method of operation.

The following non-limiting examples are included to demonstrate specific embodiments of the invention. It should be appreciated by those of skill in the art that the techniques disclosed in the examples which follow represent techniques discovered by the inventor to function well in the practice of the invention, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the invention.

Figure 1:
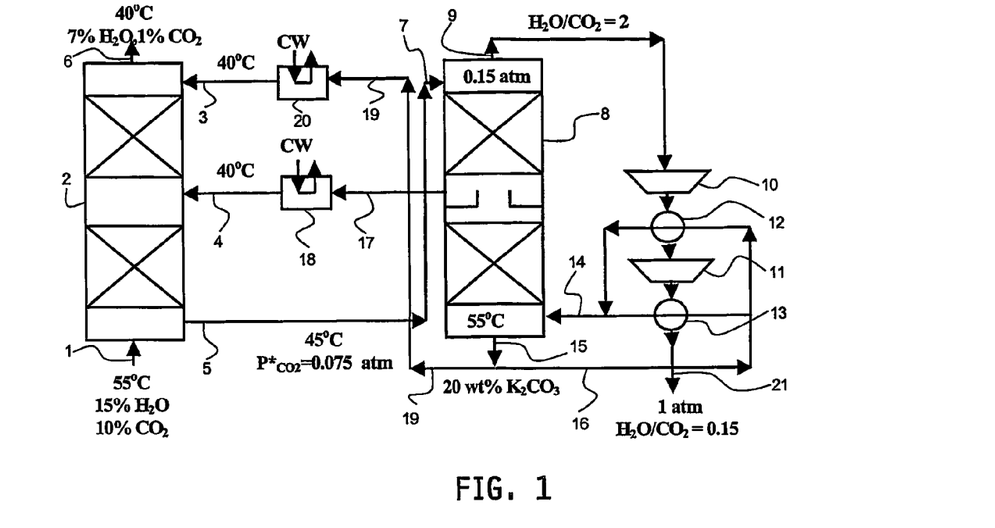
FIG. 1 is a schematic drawing of $CO_2$ capture by potassium carbonate absorption/stripping utilizing one possible vapor recompression for energy integration.
Figure 2:
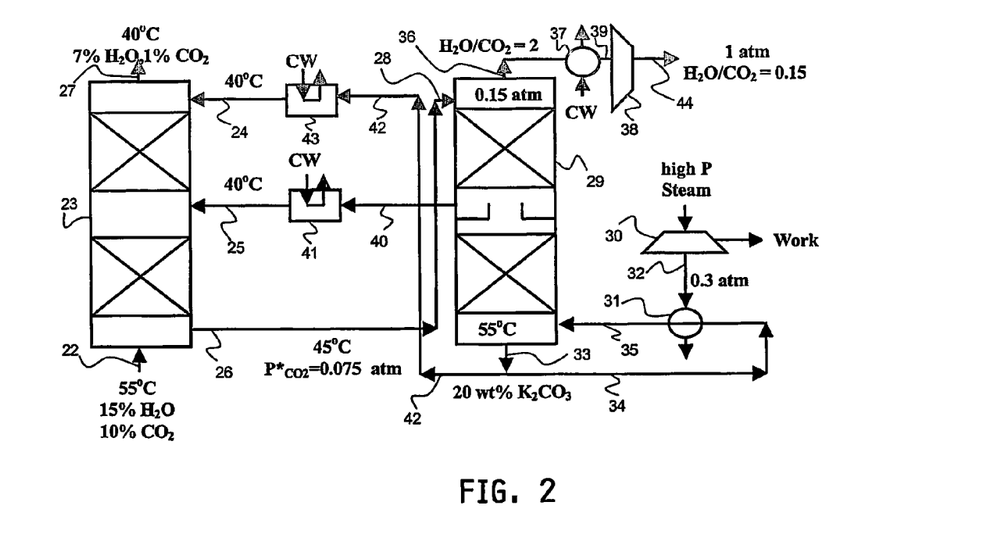
FIG. 2 is a schematic drawing of $CO_2$ capture by potassium carbonate absorption/stripping utilizing conventional turbine exhaust steam for energy integration.
Figure 3:
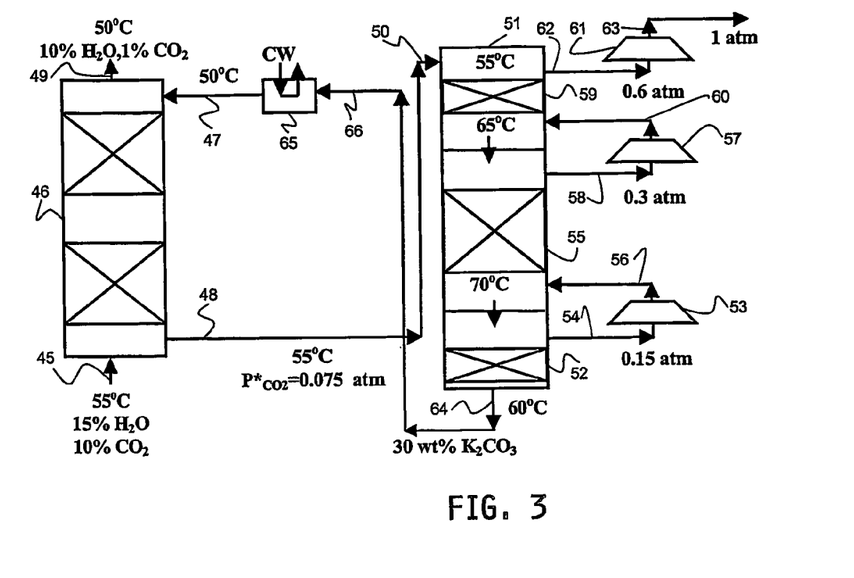
FIG. 3 is a schematic drawing of $CO_2$ capture by potassium carbonate absorption/stripping utilizing multipressure stripping for energy integration according to embodiments of the present invention.

FIG. 1, FIG. 2, and FIG. 3 show the same carbon dioxide capture process utilizing three different modes of energy integration. The solvent used in the example process is an amine promoted aqueous potassium carbonate, although other solvents known in the art may be used as well. FIG. 1 and FIG. 2 show processes utilizing known modes of energy integration, whereas FIG. 3 shows a process utilizing multipressure stripping for energy integration according to embodiments of the present invention.

COMPARATIVE EXAMPLE 1

FIG. 1 shows a process utilizing one possible vapor recompression for energy integration. Referring to FIG. 1, a gas which contains a high concentration of $CO_2$, for example a natural gas or a flue gas, is passed, via line 1, into the bottom of absorption column 2 and flows up through column 2 counter-current to absorbent flowing down the column. At the same time, lean absorption solvent, in this example a promoted potassium carbonate, is passed via line 3 to the upper end of the absorption column and semi-lean absorption solvent is fed via line 4 to a location intermediate the upper and lower ends of column 2. The absorption solvent, which is fed counter-current to the gas, becomes laden with $CO_2$, and the rich absorption solvent is taken off at the bottom of the absorption column via line 5. The washed gas is taken off at the top of the absorption column via line 6.

Thus, the gas to be treated is scrubbed against semi-lean absorbent near the middle and lower end of absorption column 2 and against lean absorbent near the top of absorption column 2 to absorb most of the specified gas while passing most of the other gases in the gas to be treated out of the absorption step. The bulk of the absorption takes place near the bottom of column 2 by using semi-lean absorbent. Only the last traces of the $CO_2$ are removed from the gas in the top section of absorption column 2.

The $CO_2$-rich absorbent solvent is then fed, via line 7, to the upper end of a vacuum stripping column 8, where the rich absorbent flows down column 8. Heat is provided to the stripper by compressing the stripper overhead exiting column 8 via line 9 in compressors 10 and 11 and condensing its contained water vapor against a recirculating stream from the stripper bottoms in condensers 12 and 13. The recirculating stream from the stripper bottoms exits column 8 via line 15, and a portion of it is fed through condensers 12 and 13 via line 16. The recirculating stream is fed back to column 8 via line 14. Compressed gas containing the $CO_2$ stripped from the rich absorbent liquid exits the system via line 21. The heat provided to the stripper is used to generate the vapor necessary for stripping the $CO_2$ from the rich absorbent. The vapor generated from heating the rich absorbent rises up through the stripping column 8 countercurrent to the rich absorbent liquid flowing down column 8. As the vapor rises to the top of the stripping column, it strips the $CO_2$ from the rich absorbent. The vapor rising from the stripper bottom is mainly water vapor since aqueous solvents generally have a low volatility. At the top of column 8, the vapor carrying the $CO_2$ stripped from the rich absorbent is passed via line 9 through compressor 10 as described previously.

Semi-lean absorbent liquid is withdrawn from a location intermediate the lower and upper ends of stripping column 8 via line 17 and is recycled to a location intermediate the upper and lower ends of absorption column 2. Thus, the semi-lean absorbent withdrawn via line 17 is fed to heat exchanger 18, where it is cooled with cooling water to a temperature and is then fed to absorption column 2 via line 4. A portion of the lean absorbent liquid taken from the bottom of stripping column 8 via line 15 is recycled to the upper end of absorption column 2. Thus, some of the lean absorbent withdrawn via line 15 is fed to heat exchanger 20 via line 19, where it is cooled with cooling water to a temperature and is then fed to absorption column 2 via line 3.

COMPARATIVE EXAMPLE 2

FIG. 2 shows a process utilizing conventional turbine exhaust steam for energy integration. Referring to FIG. 2, a gas which contains a high concentration of $CO_2$, for example a natural gas or a flue gas, is passed, via line 22, into the bottom of absorption column 23 and flows up through column 23 counter-current to absorbent flowing down the column. At the same time, lean absorption solvent, in this example a promoted potassium carbonate, is passed via line 24 to the upper end of the absorption column and semi-lean absorption solvent is fed via line 25 to a location intermediate the upper and lower ends of column 23. The absorption solvent, which is fed counter-current to the gas, becomes laden with $CO_2$, and the rich absorption solvent is taken off at the bottom of the absorption column via line 26. The washed gas is taken off at the top of the absorption column via line 27.

Thus, the gas to be treated is scrubbed against semi-lean absorbent near the middle and lower end of absorption column 23 and against lean absorbent near the top of absorption column 23 to absorb most of the specified gas while passing most of the other gases in the gas to be treated out of the absorption step. The bulk of the absorption takes place near the bottom of column 23 by using semi-lean absorbent. Only the last traces of the $CO_2$ are removed from the gas in the top section of absorption column 23.

The $CO_2$-rich absorbent solvent is then fed, via line 28, to the upper end of a vacuum stripping column 29, where the rich absorbent flows down column 29. Heat is provided to the stripper by using exhaust steam from steam turbine 30. High pressure steam is fed to turbine 30 via line 36, and the turbine produces some form of work, such as electricity. The exhaust steam from turbine 30 is fed to condenser 31 via line 32, where it is condensed against a recirculating stream from the stripper bottoms. The recirculating stream from the stripper bottoms exits column 29 via line 33, and a portion of it is fed through condenser 31 via line 34. The recirculating stream is fed back to column 29 via line 35. The heat provided to the stripper is used to generate the vapor necessary for stripping the $CO_2$ from the rich absorbent. The vapor generated from heating the rich absorbent rises up through the stripping column 29 countercurrent to the rich absorbent liquid flowing down column 29. As the vapor rises to the top of the stripping column, it strips the $CO_2$ from the rich absorbent. The vapor rising from the stripper bottom is mainly water vapor since aqueous solvents generally have a low volatility. At the top of column 29, the vapor carrying the $CO_2$ stripped from the rich absorbent is passed via line 36 through condenser 37, where heat exchange with cooling water causes most of the water in the vapor to condense out. The remaining vapor, which is high in $CO_2$ concentration, is fed to compressor 38 via line 39. The compressed $CO_2$-rich gas exits the system via line 44.

Semi-lean absorbent liquid is withdrawn from a location intermediate the lower and upper ends of stripping column 29 via line 40 and is recycled to a location intermediate the upper and lower ends of absorption column 23. Thus, the semi-lean absorbent withdrawn via line 40 is fed to heat exchanger 41, where it is cooled with cooling water to a temperature and is then fed to absorption column 23 via line 25. A portion of the lean absorbent liquid taken from the bottom of stripping column 29 via line 33 is recycled to the upper end of absorption column 23. Thus, some of the lean absorbent withdrawn via line 33 is fed to heat exchanger 43 via line 42, where it is cooled with cooling water to a temperature and is then fed to absorption column 23 via line 24.

EXAMPLE 1

FIG. 3 shows a process utilizing multipressure stripping for energy integration according to embodiments of the present invention. Referring to FIG. 3, a gas which contains a high concentration of $CO_2$, for example a natural gas or a flue gas, is passed, via line 45, into the bottom of absorption column 46 and flows up through column 46 counter-current to absorbent flowing down the column. At the same time, lean absorption solvent, in this example a promoted potassium carbonate, is passed via line 47 to the upper end of the absorption column. The absorption solvent, which is fed counter-current to the gas, becomes laden with $CO_2$, and the rich absorption solvent is taken off at the bottom of the absorption column via line 48. The washed gas is taken off at the top of the absorption column via line 49.

The $CO_2$-rich absorbent solvent is then fed, via line 50, to the upper end of a multipressure stripping column 51, where the rich absorbent flows down column 51. The multipressure stripping column is a multistage flash, whereby the lowest flash stage 52 provides stripping steam by flashing the absorption solvent. The stripping steam then contacts the rich absorbent liquid in each flash stage and strips the $CO_2$ from the rich absorbent liquid. The total vapor flow produced in lowest stage 52 is fed through compressor 53 via line 54. The compressed vapor exiting compressor 53 is fed to the bottom of intermediate flash stage 55 via line 56. The total vapor flow produced in intermediate flash stage 55 is fed through compressor 57 via line 58. The compressed vapor exiting compressor 57 is fed to the bottom of top flash stage 59 via line 60. The total vapor flow produced in top flash stage 59 is fed through compressor 61 via line 62. The $CO_2$-rich compressed vapor exiting compressor 62 exits the system via line 63.

The lean absorbent liquid taken from the bottom of multipressure stripping column 51 via line 64 is recycled to the upper end of absorption column 46. Thus, some of the lean absorbent withdrawn via line 64 is fed to heat exchanger 65 via line 66, where it is cooled with cooling water to a temperature and is then fed to absorption column 46 via line 47.

Using known vapor recompression as shown in FIG. 1, heat will be provided to the stripper by compressing the stripper overhead and condensing its contained water vapor against a recirculating stream from the stripper bottoms. The compression work will also be recovered as heat in the stripper bottoms. This feature replaces steam with equivalent power. Vapor recompression may require an axial flow compressor with high volume capacity for water vapor. The capital cost of this compressor may be significant. It will be comparable in size to the air compressor of a large gas turbine for a power plant of the equivalent size, but the shaft power requirement will be an order of magnitude smaller because of the low density of the vacuum stream.

Using conventional turbine exhaust steam as shown in FIG. 2, a steam turbine could produce electricity and could provide the additional work required to compress the $CO_2$ from 0.15 atm to 1 atm. The capital cost of compressors would be significantly reduced relative to that for vapor recompression. However, the capital cost of a steam turbine may be significant.

Compared to the conventional modes of energy integration shown in FIG. 1 and FIG. 2, the multipressure stripping mode of energy integration of the present invention shown in FIG. 3 offers the minimum energy configuration with the minimum amount of heat exchange. The bottom stage provides stripping steam by flashing the solvent. The top stage recovers heat and drives the overall stripper to a greater temperature and pressure. All of the energy is provided as work, either from off-peak electricity or from steam turbines.

EXAMPLE 2

Figure 4:
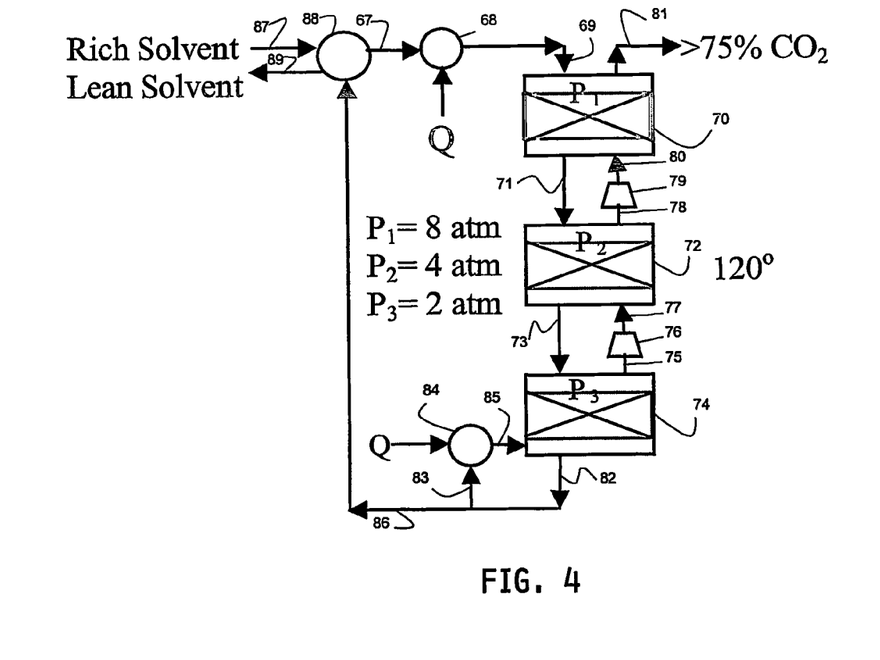
FIG. 4 is a schematic diagram of the multipressure stripping process according to embodiments of the present invention.

A schematic diagram of a multipressure stripping process according to embodiments of the present disclosure is shown in FIG. 4. Referring to FIG. 4, $CO_2$-rich absorbent solvent is fed, via line 87, through cross exchanger 88. The solvent is then fed, via line 67, through cross exchanger 68. The rich absorbent is then fed, via line 69, to the top stage 70 of a multipressure stripping column, where the rich absorbent flows down the column via lines 71 and 73. The multipressure stripping column is a multistage flash, whereby the lowest flash stage 74 provides stripping steam by flashing the absorption solvent. The stripping steam then contacts the rich absorbent liquid in each flash stage and strips the $CO_2$ from the rich absorbent liquid. The total vapor flow produced in lowest stage 74 is fed through compressor 76 via line 75. The compressed vapor exiting compressor 76 is fed to the bottom of intermediate flash stage 72 via line 77. The total vapor flow produced in intermediate flash stage 72 is fed through compressor 79 via line 78 The compressed vapor exiting compressor 79 is fed to the bottom of top flash stage 70 via line 80. The $CO_2$-rich compressed vapor exiting top flash stage 70 exits the system via line 81.

A portion of the lean absorbent liquid exiting lowest flash stage 74 via line 82 is recycled to lowest flash stage 74. Thus, some of the lean absorbent withdrawn via line 82 is fed to cross exchanger 84 via line 83, where it is then fed to lowest flash stage 74 via line 85. The remainder of the lean absorbent liquid exiting lowest flash stage 74 via line 82 that is not recycled to lowest flash stage 74 is fed to cross exchanger 88 via line 86. The lean absorbent liquid exiting cross exchanger 88 is then recycled back to the absorption stage of the process via line 89.

The stripper configuration depicted in FIG. 4 was simulated assuming equilibrium contacting in a spreadsheet simulation with a hypothetical solvent. The nonlinear equilibrium of the system was represented by the simple equation:

$$Ln\, P_{CO2} = a + B*ldg - \Delta/RT$$

The constant B was selected to give the specified capacity (m=gmol/kg water) for $CO_2$ absorption at the nominal absorber temperature, T. The heat of absorption, $\Delta H$, was also varied to simulate different solvents; a value of 22 kcal/gmol is typical of monoethanolamine (MEA); a value of 15 kcal/gmol would represent an alternative solvent. The heat rate, Q, was provided at a maximum temperature of 120° C. with a 10° C. driving force. The equivalent work of the heat was calculated from the Carnot equation:

$$\text{Equivalent Work of Steam} = Q(T_{stm} - 313)/T_{stm}$$

The approach to equilibrium at the rich and lean end of the stripper was taken to be 33% (typical of MEA systems) and 75% (possible with reactive alternative solvent). Table 1 shows the results of the aforementioned spreadsheet simulation.

TABLE 1

Simulated Energy Requirements for Multipressure Stripper

| $\Delta H$ (kcal/gmol) | Approach (%) | Q (kcal/gmol) | Compressor Work kcal/gmol) | Equivalent Work of Steam (kcal/gmol) |
|---|---|---|---|---|
| 15 | 33 | 32 | 2.2 | 8.9 |
| 15 | 75 | 28.6 | 1.4 | 7.3 |
| 22 | 33 | 34 | 1.5 | 7.5 |
| 22 | 75 | 34 | 1.0 | 6.8 |
| MEA simple | 33 rich, 5 lean | 50 | 2.0 | 12 |

Parameters: 10% $CO_2$, 40° Absorber, 90% removal, compression to 8 atm $CO_2$ 0.5 m capacity, 5° C. cross-x approach, 4 contact stages (3 compressor stages).

As shown in Table 1, the multipressure stripper requires 6.8 to 8.9 kcal equivalent work/mole $CO_2$ removed. This is 25 to 40% less than the conventional MEA stripper (12 kcal/gmol). The actual compressor work to a get a $CO_2$ product at 8 atm is 1.0 to 2.2 kcal/gmol. Even though the multipressure stripper requires some compression for water vapor, the compressor work required is not significantly different from the simple MEA stripper because much of the $CO_2$ is produced at higher pressure.

The net heat requirement for the multipressure stripper (29-34 kcal/gmol $CO_2$) is approximately the heat of absorption of the $CO_2$ plus 5° C. sensible heat to drive the cross exchanger 88. It is significantly less than the net heat required (40-50 kcal/gmol) for the state-of-the-art MEA technology. Therefore, the compressor capital cost and power requirement may not be significantly different from the conventional MEA stripper, but the heat requirement may be significantly reduced. A closer approach to equilibrium in the absorber reduces the equivalent total work by 10 to 20%. The solvent with the lower heat of absorption appears to be 10 to 15% better.

While the present invention may be adaptable to various modifications and alternative forms, specific embodiments have been shown by way of example and described herein. However, it should be understood that the present invention is not intended to be limited to the particular forms disclosed. Rather, it is to cover all modifications, equivalents, and alternatives falling within the spirit and scope of the invention as defined by the appended claims. Moreover, the different aspects of the disclosed equipment and methods may be utilized in various combinations and/or independently. Thus the invention is not limited to only those combinations shown herein, but rather may include other combinations, as well.

The invention claimed is:

1. An improved method for removing an acid gas from a gaseous stream containing same using aqueous absorption and stripping equipment, the improvement comprising:
    (a) passing the acid gas-rich solvent stream exiting the absorbing equipment through a multipressure stripper in which the acid gas-rich solvent stream passes through multiple flash stages such that the vapor obtained by flashing the acid gas-rich solvent stream in each flash stage strips the acid gas from the acid gas-rich solvent stream, resulting in an acid gas-rich gaseous stream exiting the multipressure stripper and an acid gas-lean solvent stream exiting the multipressure stripper; wherein the multipressure stripper is operated at multiple pressure levels such that the vapor obtained in each flash stage is compressed in a compressor and fed to the previous flash stage at a higher pressure; and
    (b) recycling the acid gas-lean solvent stream exiting the multipressure stripper in step (a) back to the absorption equipment at least once,
    wherein additional heat is supplied at the flash stage operated at the lowest pressure level.

2. The method of claim 1, wherein one or more of the stages of the multipressure stripper is a countercurrent contactor.

3. The method of claim 1, wherein one or more of the stages of the multipressure stripper is a cocurrent contactor.

4. The method of claim 1, wherein one or more of the stages of the multipressure stripper is a mixed contactor.

5. The method of claim 1, wherein the gaseous stream comprises flue gas, natural gas, hydrogen gas, or synthesis gas.

6. The method of claim 1, wherein the acid gas comprises carbon dioxide.

7. The method of claim 1, wherein the acid gas comprises hydrogen sulfide.

8. The method of claim 1, wherein the solvent is an aqueous amine, an aqueous alkanolamine, or mixtures thereof.

9. The method of claim 1, wherein the solvent is an amine promoted aqueous potassium carbonate.

10. The method of claim 1, wherein additional heat is supplied at one or more of the stages of the multipressure stripper other than the flash stage operated at the lowest pressure level.

11. An equipment for stripping an acid gas from an acid gas-rich solvent stream, comprising:

(a) a stripping column comprising multiple flash stages; and
(b) at least one compressor connected between each of the flash stages such that vapor produced in each flash stage is compressed and fed to the previous flash stage at a higher pressure; and
(c) means for supplying additional heat at the flash stage operated at the lowest pressure level.

12. The equipment of claim 11, wherein one or more of the stages of the stripping column is a countercurrent contactor.

13. The equipment of claim 11, wherein one or more of the stages of the stripping column is a cocurrent contactor.

14. The equipment of claim 11, wherein one or more of the stages of the stripping column is a mixed contactor.

15. The equipment of claim 11, further comprising means for supplying additional heat at one or more of the stages of the multipressure stripper other than the flash stage operated at the lowest pressure level.

* * * * *